(12) United States Patent
Mohanty et al.

(10) Patent No.: US 11,418,403 B2
(45) Date of Patent: Aug. 16, 2022

(54) CONTROLLER DRIVEN DESIGNATED FORWARDER ELECTION IN EVPN NETWORKS FOR OPTIMIZED LOAD DISTRIBUTION

(71) Applicant: Cisco Technology, Inc., San Jose, CA (US)

(72) Inventors: Satya Ranjan Mohanty, San Ramon, CA (US); Mrinmoy Ghosh, Milpitas, CA (US); Dhananjaya Rao, Sunnyvale, CA (US); Sameer R. Gulrajani, Fremont, CA (US); Mankamana Prasad Mishra, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 79 days.

(21) Appl. No.: 16/934,731

(22) Filed: Jul. 21, 2020

(65) Prior Publication Data

US 2022/0029890 A1 Jan. 27, 2022

(51) Int. Cl.
*H04L 41/12* (2022.01)
*H04L 12/46* (2006.01)
*H04L 41/14* (2022.01)
*H04L 47/125* (2022.01)
*H04L 45/02* (2022.01)

(52) U.S. Cl.
CPC .......... *H04L 41/12* (2013.01); *H04L 12/4641* (2013.01); *H04L 41/14* (2013.01); *H04L 45/04* (2013.01); *H04L 47/125* (2013.01)

(58) Field of Classification Search
CPC ..... H04L 41/12; H04L 41/14; H04L 12/4641; H04L 45/04; H04L 47/125
See application file for complete search history.

(56) References Cited

U.S. PATENT DOCUMENTS

| | | | |
|---|---|---|---|
| 6,678,241 B1 | 1/2004 | Gai et al. | |
| 6,741,592 B1 | 5/2004 | Edsall et al. | |
| 6,976,088 B1 | 12/2005 | Gai et al. | |
| 7,581,024 B1 | 8/2009 | Yip et al. | |
| 9,923,781 B2 * | 3/2018 | Chaiapathy | H04L 45/50 |
| 10,164,876 B2 | 12/2018 | Kanjariya et al. | |
| 11,070,459 B2 * | 7/2021 | Barry | H04L 45/42 |

(Continued)

OTHER PUBLICATIONS

Harvey, Nick et al., "Semi-Matchings for Bipartite Graphs and Load Balancing", downloaded Jul. 21, 2020, 86 pages.

(Continued)

*Primary Examiner* — S M A Rahman
(74) *Attorney, Agent, or Firm* — Edell, Shapiro & Finnan, LLC

(57) ABSTRACT

A method is performed by a network controller. The method includes receiving information that defines a topology of a network having Ethernet Segments configured with virtual local area networks (VLANs) and including provider edges that are multi-homed to customer edges. The method further comprises, based on the topology, determining for the VLANs particular provider edges among the provider edges that are to operate as designated forwarders of traffic for the VLANs, such that the VLANs are load balanced across the particular provider edges. The method also includes programming the particular provider edges as the designated forwarders of traffic for the VLANs.

20 Claims, 13 Drawing Sheets

(56) References Cited

U.S. PATENT DOCUMENTS

| | | | |
|---|---|---|---|
| 2006/0182121 A1 | 8/2006 | Kounin et al. | |
| 2007/0237148 A1 | 10/2007 | Jabr et al. | |
| 2009/0037607 A1 | 2/2009 | Farinacci et al. | |
| 2013/0173756 A1 | 7/2013 | Luna et al. | |
| 2013/0198558 A1 | 8/2013 | Rao et al. | |
| 2017/0339052 A1* | 11/2017 | Arora | H04L 45/66 |
| 2020/0387804 A1* | 12/2020 | Mathur | G06N 5/046 |

OTHER PUBLICATIONS

Eastlake, Donald et al., "Centralized EVPN DF Election", draft-hao-bess-evpn-centralized-df-03.txt, Internet-Draft, Intended status: Proposed Standard, Oct. 14, 2018, 14 pages.

H. Gredler et al., "North-Bound Distribution of Link-State and TE Information using BGP", draft-ietf-idr-ls-distribution-05, Inter-Domain Routing, Internet-Draft, Intended status: Standards Track, May 21, 2014, 39 pages.

P. Mohapatra et al., "BGP Link Bandwidth Extended Community", draft-ietf-idr-link-bandwidth-07.txt, Network Working Group, Internet-Draft, Intended status: Standards Track, Mar. 5, 2018, 5 pages.

Noghani, Kyoomars Alizadeh et al., "SDN Enhanced Ethernet VPN for Data Center Interconnect", arXiv:1911.00779v1 [cs NI], Nov. 2, 2019, 6 pages.

Eastlake, Donald et al., "Centralized EVPN DF Election", draft-hao-bess-evpn-centralized-df-04.txt, Internet-Draft, Intended status: Proposed Standard, Apr. 10, 2019, 14 pages.

S. Mohanty et al., "Weighted HRW and its applications", draft-mohanty-bess-weighted-hrw-00, BESS Working Group, Internet-Draft, Intended status: Standards Track, Mar. 11, 2019, 11 pages.

N. Malhotra, Ed. et al., "Weighted Multi-Path Procedures for EVPN All-Active Multi-Homing", draft-ietf-bess-evpn-unequal-lb-00, Internet-Draft, Sep. 19, 2018, 18 pages.

J. Rabadan, Ed. et al., "Preference-based EVPN DF Election", draft-ietf-bess-evpn-pref-df-03, BESS Workgroup, Internet Draft, Intended status: Standards Track, Dec. 21, 2018, 15 pages.

A. Sajassi et al., "IGMP and MLD Proxy for EVPN", draft-ietf-bess-evpn-igmp-mld-proxy-05, BESS WorkGroup, Internet-Draft, Intended status: Standards Track, Apr. 28, 2020, 33 pages.

N. Malhotra, Ed. et al., "Weighted Multi-Path Procedures for EVPN All-Active Multi-Homing", drafl-ietf-bess-evpn-unequal-lb-03, BESS Working Group, Internet-Draft, Intended Status: Proposed Standard, Nov. 2, 2019, 19 pages.

J. Rabadan, Ed. et al., "Framework for EVPN Designated Forwarder Election Extensibility", draft-ietf-bess-evpn-df-election-framework-09, BESS Workgroup, Internet Draft, Updates: 7432, Intended status: Standards Track, Jan. 24, 2019, 29 pages.

A. Sajassi, Ed. et al., "BGP MPLS-Based Ethernet VPN", Internet Engineering Task Force (IETF), Request for Comments: 7432, Category: Standards Track, ISSN: 2070-1721, Feb. 2015, 56 pages.

Noghani, Kyoomars Alizadeh et al., "SDN Enhanced Ethernet VPN for Data Center Interconnect", https://ieeexplore.ieee.org/document/8071535, Sep. 2017, 6 pages.

Harvey, Nicholas J. A. et al., "Semi-Matchings for Bipartite Graphs and Load Balancing", vol. 59, Issue 1, Apr. 2006, 12 pages.

Ali. Sajassi et al., "Per multicast flow Designated Forwarder Election for EVPN", draft-ietf-bess-evpn-per-mcast-flow-df-election-01, BESS WorkGroup, Internet-Draft, Intended status: Standards Track, Mar. 8, 2019, 12 pages.

\* cited by examiner

VLAN ASSIGNMENT BIPARTITE GRAPH

VLAN ASSIGNMENT BIPARTITE GRAPH

VLAN ASSIGNMENT BIPARTITE GRAPH

VLAN ASSIGNMENT BIPARTITE GRAPH

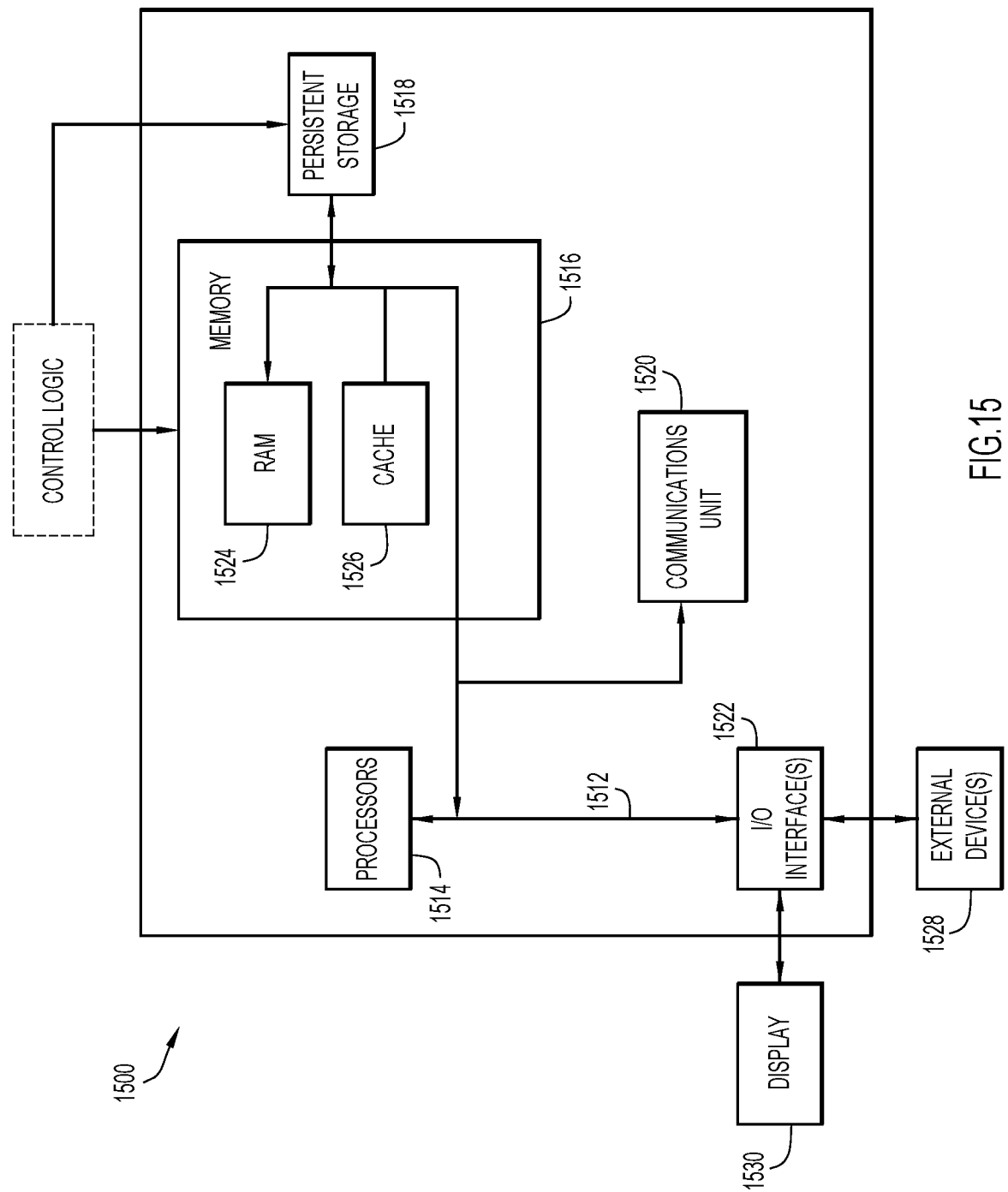

CONTROLLER DRIVEN DESIGNATED FORWARDER ELECTION IN EVPN NETWORKS FOR OPTIMIZED LOAD DISTRIBUTION

TECHNICAL FIELD

The present disclosure relates to designated forwarder (DF) election in an Ethernet (E) virtual private network (VPN) (EVPN).

BACKGROUND

An EVPN network may include multiple Ethernet segments each having provider edges (PEs) that are multi-homed to customer edge devices, and each configured with a set of virtual local area networks (VLANs). Conventional EVPN DF election elects various ones of the PEs as DFs for the VLANs. Conventional EVPN DF election is constrained in scope because the election is performed at a granularity of an individual Ethernet Segment, and does not account for other Ethernet segments that share a given PE. Disadvantageously, this can result in election of the given PE as the DF for an overly large number of VLANs that are configured across all of the Ethernet segments that share the given PE, which prevents even load balancing across the PEs and the Ethernet segments.

BRIEF DESCRIPTION OF THE DRAWINGS

FIG. 15 is a hardware block diagram of a computing device that may perform functions of the network controller, according to an example embodiment.

DESCRIPTION OF EXAMPLE EMBODIMENTS

Overview

Figure 1:
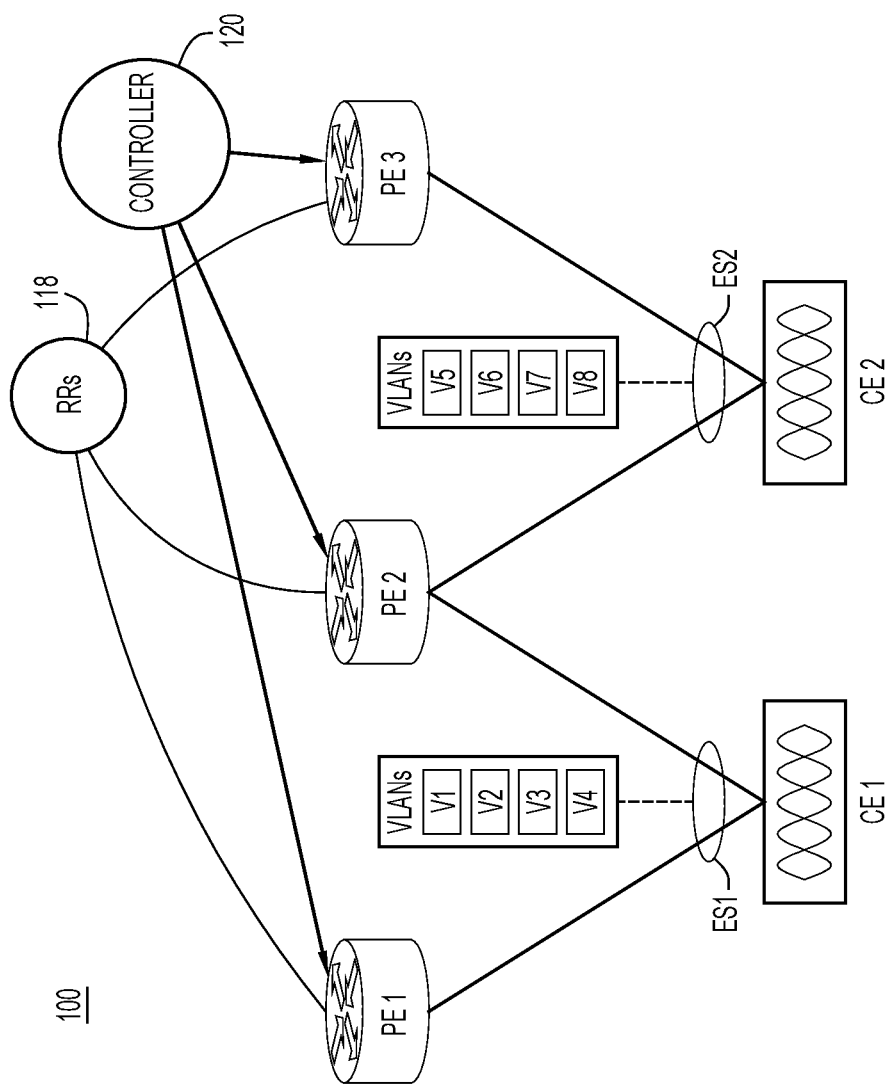
FIG. 1 is a block diagram of an EVPN network in which a network controller may perform dynamic DF election to achieve load balancing across multi-homed PEs that share Ethernet segments, according to an example embodiment.

A method is performed by a network controller. The method includes receiving information that defines a topology of a network having Ethernet Segments configured with virtual local area networks (VLANs) and including provider edges that are multi-homed to customer edges. The method further comprises, based on the topology, determining for the VLANs particular provider edges among the provider edges that are to operate as designated forwarders of traffic for the VLANs, such that the VLANs are load balanced across the particular provider edges. The method also includes programming the particular provider edges as the designated forwarders of traffic for the VLANs.

EXAMPLE EMBODIMENTS

Challenges associated with designated forwarder (DF) election are described first. A data center (DC) can be a highly dynamic and variable environment in terms of workloads, connectivity to a network fabric, services enabled on the network fabric and the traffic load the services consume. Workloads may be virtualized, bare-metal servers, physical network functions or even access sub-networks. In micro/mini network DCs, workloads and/or switches may directly connect to provider edges (PEs) or, in larger leaf-spine DC fabrics, the leafs may act as PEs themselves with workloads being attached to two or more leafs nodes for redundancy. In both types of networks, the connectivity of workloads across PEs as well as the traffic load distribution across different PEs can be highly asymmetric over time. Similarly, in a carrier access/aggregation environment, the load on PEs can be quite high and asymmetric because it is unrealistic to expect customer edge (CE) (referred to collectively as "CEs" and singularly as a "CE") to be distributed uniformly across available PEs.

In addition, distribution of traffic across a multi-homed Ethernet segment to a CE can also be asymmetric depending on the traffic flows. Certain applications require high-bandwidth multicast flows that can only be sent to a CE over a single PE connection in order to avoid duplicates/loops.

Border Gate Protocol (BGP)-EVPN is a technology that is used heavily in both DCs and in access/aggregation environments to enable Ethernet/VLAN/Peer-to-Peer (P2P) and Layer-3 (L3) services. One of the fundamental aspects of EVPN is DF election that is performed among the PEs that are members of a multi-homed Ethernet segment and used to ensure loop and duplicate free forwarding of broadcast and multicast traffic to a CE/network that is attached to the multi-homed segment.

Conventional EVPN DF election is constrained in scope because the election is performed at a granularity of an individual Ethernet Segment, by definition. Conventional mechanisms may achieve load distribution of traffic flows across DFs within a given Ethernet segment, but not across multiple Ethernet segments. This is because such mechanisms do not account for other Ethernet segments for which a PE in the given Ethernet segment is also enabled, nor is it is trivial or scalable to account for dynamic load such as traffic utilization. Additionally, given a number of PEs at a given location, there can be an arbitrarily intersecting set of attached multi-homed and singly-homed CEs.

Conventional DF election for EVPN includes the following constraints and disadvantages, for example:
 a. Conventional DF election only distributes VLANs relatively evenly across multi-homed PEs on the same Ethernet segment, such that each PE is the DF for a non-overlapping set of VLANs of multiple Ethernet segments. No consideration is given to the number of multi-homed Ethernet Segments that are hosted on any given PE.
 b. It is desirable to be able to explicitly direct a multicast flow to pass through a specific PE, but such control is not available and harder to achieve with distributed DFs.
 c. There is no mechanism that takes into account both bandwidth usage and traffic load in conventional DF election. This negatively impacts multicast streams because of their high bandwidth requirements.

Consider a simple example in which PEs PE1 and PE2 are multi-homed to a CE CE1 on a first Ethernet segment configured with 200 VLANs, and PEs PE2 and PE3 are multi-homed to CE CE2 on a second Ethernet segment configured with 200 VLANs. In this arrangement, the first and second Ethernet segments share PE2. For the first Ethernet segment, conventional DF election ensures that PE1 and PE2 will each be assigned half of the 200 VLANs (e.g., 100 VLANs) of the first Ethernet Segment. For the second Ethernet segment, conventional DF election ensures that PE2 and PE3 will each be assigned half of the 100 VLANs (e.g., 100 VLANs) of the second Ethernet Segment. As a result, PE2 is loaded with twice the number of VLANs compared to each of PE1 and PE3. This occurs because conventional DF election is always made with respect to a given Ethernet Segment only, and no consideration is given to other Ethernet segments and/or a load factor of a given PE. Also, conventional DF election does not consider service bandwidth requirements. Because conventional DF election is made only with respect to an Ethernet segment of interest, it is often not globally optimal. In a data center, this means that there may be an unequal and skewed traffic distribution across multi-homed PEs.

Accordingly, techniques presented herein perform DF election of multi-homed PEs that are shared among Ethernet segments in order to minimize loading on the PEs. The techniques consider VLANs configured on all of the shared Ethernet segments to which the PEs belong when determining whether to elect the PEs as DFs for traffic associated with the VLANs. The techniques may be implemented by a network controller configured to communicate with and control the multi-homed PEs across the Ethernet segments. The network controller may include an independent network controller application, but may reside with a route-reflector (RR). The network controller is aware of a complete EVPN service topology that includes the Ethernet segments. The network controller may collect information that defines the topology from type-4 routes, from the PEs, and from other sources. The network controller may also learn about access bandwidth on the Ethernet segments via a link-bandwidth extended community using existing BGP methods, for example. The network controller may also collect such information dynamically or in near real-time utilization via telemetry.

Armed with the above-mentioned information, the network controller enhances the following aspects of DF election over conventional techniques.
 a. The DF election may be enhanced to intelligently perform service carving or weighted distribution across different Ethernet segments to achieve better load distribution.
 b. By using traffic measurement and centralized accounting across member PE-CE links for an Ethernet segment, the network controller can realize a more realistic load balancing of traffic towards the CE across its member links.
 c. With the broader visibility provided by a full network view, the network controller can take into account metrics such as PE load (core links/sustained queue depth), upstream network path characteristics (delay/cost) to provide fairer load distribution among PEs, e.g., by customizing DF elections of the various Ethernet segments spread across the PEs.

With reference to FIG. 1, there is a block diagram of an example EVPN network 100 in which dynamic DF election to achieve load balancing across multi-homed PEs that share Ethernet segments may be implemented. Network 100 includes multi-homed PEs PE1, PE2, and PE3, CEs CE1 and CE2 to which the PEs are multi-homed, a network controller 120 to control the PEs, and route reflectors (RRs) 118 all connected to, and configured to communicate with, each other over various network connections/links. Multicast receivers (not shown in FIG. 1) sit behind the CEs CE1 and CE2. PEs PE1-PE3 and CEs CE1 and CE2 each represent a network device or node, such as a router or switch, and may be a hardware device, or a virtual device (e.g., applications hosted on a server). While only a small number of network nodes are shown, thousands may actually be present in a typical network. In the ensuing description, CEs CE1, CE2 may be referred simply as "CE1," "CE2," respectively, and PEs PE1, PE2, and PE3 may be referred to simply as "PE1," "PE2," and "PE3," respectively.

PE1 and PE2 are connected to CE1 over a first set of Ethernet links comprising an Ethernet Segment (ES) ES1, and PE2 and PE3 are connected to CE2 over a second set of Ethernet links comprising an Ethernet segment ES2. Ethernet segments ES1, ES2 are identified by Ethernet segment identifiers (IDs) (ESIs) ESI1, ESI2, respectively. In the example of FIG. 1, CE1 is multi-homed to PE1 and PE2 through Ethernet segment ES1, and CE2 is multi-homed to PE2 and PE3 through Ethernet segment ES2. Thus, PE1 and PE2 are configured with Ethernet identifier ES1, and PE2 and PE3 are configured with Ethernet identifier ES2. In the example, Ethernet segments ES1 and ES2 share PE2, i.e., PE2 serves both Ethernet segments ES1 and ES2. More generally, multiple Ethernet segments may share one or more PEs, i.e., one or more PEs may be shared among multiple Ethernet segments.

Generally, PE1-PE3 forward traffic to and from CE1 and CE2. To this end, Ethernet segment ES1 is configured with a first set of VLANs V1-V4, Ethernet Segment ES2 is configured with a second set of VLANs V5-V8, respectively. VLANs V1-V8 have respective VLAN IDs. More specifically, PE1 and PE2 may be configured to forward broadcast, unknown Unicast, and multicast (BUM) traffic originating from source equipment (not shown) to CE1 over Ethernet segment ES1, and PE2 and PE3 may be configured to forward traffic originating from the source equipment to CE2 over Ethernet segment ES2. In turn, CE1 and CE2 forward the traffic to receiver equipment (not shown) for consumption.

For Ethernet segment ES1, only one of PE1 and PE2 assumes a primary role for forwarding traffic on a per-VLAN basis to CE1 at any given time. Similarly, for Ethernet segment ES2, only one of PE2 and PE3 assumes a primary role for forwarding traffic on a per-VLAN basis to CE2 at any given time. The PE that serves the primary role for forwarding the traffic for a given VLAN on a given Ethernet segment is referred to as the DF for the given VLAN on the given Ethernet segment. Network controller 120 elects/determines the DFs on each Ethernet segments ES1, ES2 for each of VLANs V1-V8 in accordance with techniques presented herein, as described below.

Network controller 120 may be hosted on one or more servers, for example, and communicates with network nodes including PE1-PE3, CE1, CE2, and RRs 118 over various network links. In some embodiments, RRs 118 and network controller 120 may be integrated with each other into a combined entity. Network controller 120 is configured to collect network configuration information about network 100 from the various components of network 100. The network configuration information includes information indicative of a topology of network 100 and VLANS V1-V8, and other information described below. Network controller 120 may employ any known or hereafter developed network communication mechanism to collect the network configuration information, as mentioned above. For example, network controller 120 may engage in Border Gateway Protocol (BGP) sessions with the network nodes, and may learn at least some of the network configuration information through BGP messages, such as BGP advertisements, exchanged with the network nodes during the BGP sessions.

According to techniques presented herein, network controller 120 uses the network configuration information to assign/match the VLANs (e.g., VLANs V1-V8) to particular PEs (e.g., among PE1-PE3) on the Ethernet segments (e.g., Ethernet segments ES1, ES2). The particular PEs act as DFs for VLAN traffic associated with the VLANs to which the PEs are assigned/matched. In other words, network controller 120 elects various ones of PE1-PE3 as DFs for various ones of the VLANs. When assigning VLANs for a given Ethernet segment (e.g., ES1) to a particular PE (e.g., PE2) (i.e., to elect the PE as DF), network controller 120 takes into account the VLANs configured on the given Ethernet segment (e.g., ES1), as well as the VLANs configured on other Ethernet segments (e.g., ES2) that share the particular PE (e.g., PE2), such that, overall, all of the VLANs for the various Ethernet segments are load balanced across the particular PEs that act as the DFs. In one non-limiting example, VLANs may be said to be load balanced across PEs/DFs when a total number of VLANs across multiple Ethernet segments that share the PEs/DFs are evenly divided among the PEs/DFs.

Figure 2:
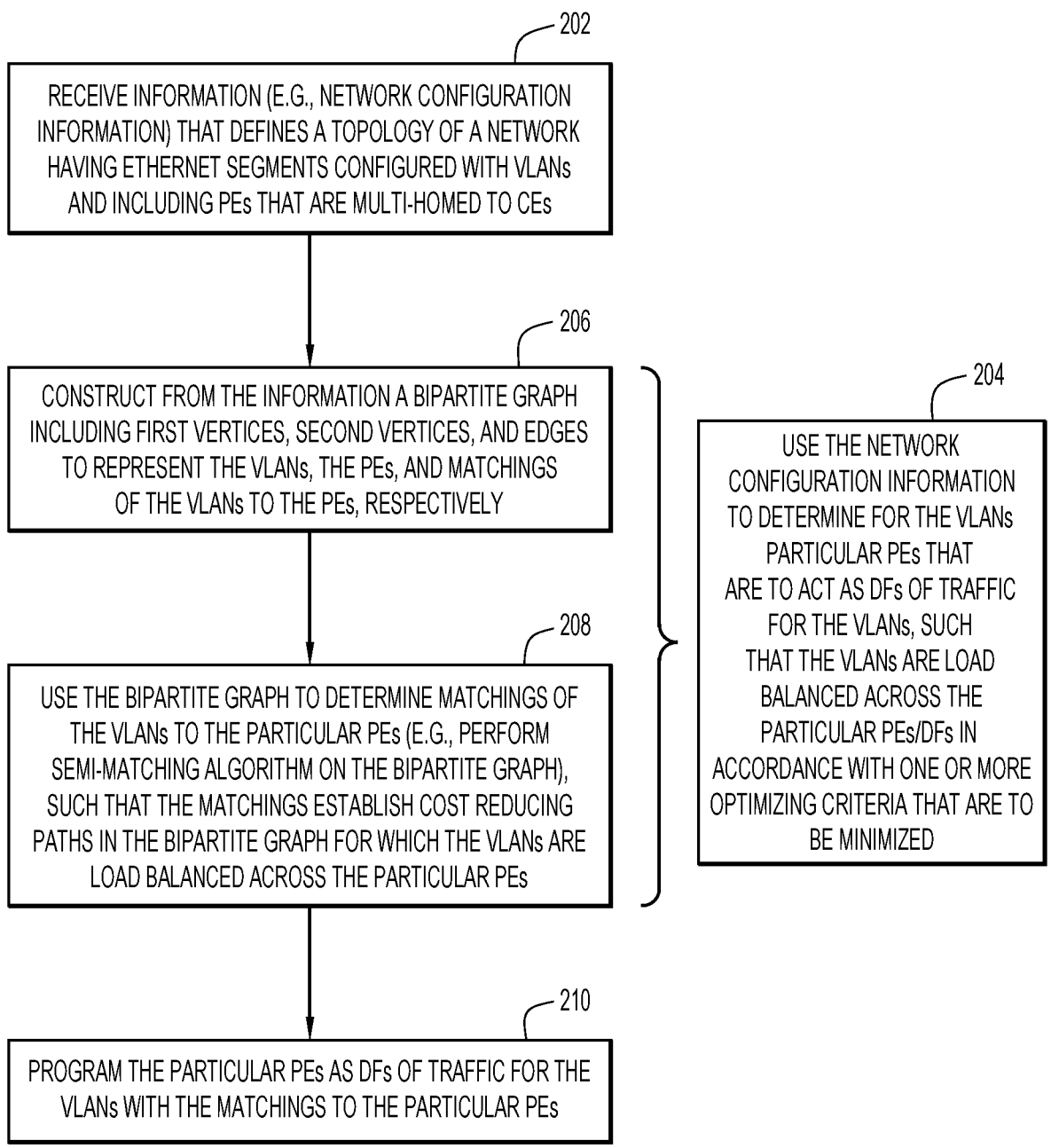
FIG. 2 is a flowchart of a method of determining/electing DFs among PEs in the network that is performed by the network controller, according to an example embodiment.

With reference to FIG. 2, there is a flowchart of an example method 300 of determining DFs among the PEs in network 100. Method 300 may be performed by controller 120.

At 202, network controller 120 collects/receives the above-mentioned network configuration information from the network nodes of network environment 100 and other entities of network 100. An administrator may also provide elements of the network configuration information to controller 120. The network configuration information indicates a topology of the network, including (i) identifiers for PE1-PE3 and CE1 and CE2, such as media access control (MAC) addresses and Internet Protocol (IP) addresses, (ii) identifiers associated with Ethernet segments ES1 and ES2, including ESIs and EVPN segment identifiers (EVIs) configured on the Ethernet segments, indications of which PEs and CEs belong to/are configured on which Ethernet segments, (iii) identifiers of connections or links of the Ethernet segments and inter-connecting the PEs and the CEs, and (iv) information identifying the VLANs configured on the Ethernet segments.

The network configuration may also include indications of quantitative capabilities, i.e., capability metrics, associated with the components of the network 100. The capabilities may include (i) central processing unit (CPU) processing power (also referred to as "processor power") for each of the PEs, and (ii) link capacities/bandwidths associated with the Ethernet segments. Network controller 120 may collect at least some of the indications of the capabilities from the PEs and the Ethernet segments periodically. Network controller 120 may also periodically collect the status of traffic queues (i.e., traffic queuing status) and PE processor loading.

At a high-level operation 204, network controller 120 uses the network configuration information collected at 202 to determine for the VLANs particular PEs (i.e., to determine for each VLAN a particular PE) among the PEs that are to operate as DFs of traffic for the VLANs, such that the VLANs are load balanced across the particular PEs in accordance with one or more optimizing criteria or costs that are to be minimized. Examples of optimizing criteria include, but are not limited to:

a. Average service time of packets at the particular PEs, makespan times (i.e. maximum times packets have to wait at the particular PEs), and variance (i.e., load balance variance of queues corresponding to each of the VLANs).
b. Weighted PE (i.e., node) cost.
c. Weighted link cost based on the link capacities of links on the Ethernet segments.

Several examples in which network controller 120 uses the above optimizing criteria to assign the VLANs to DFs among the PEs are described below in connection with FIGS. 4-12.

In an embodiment, operation 204 includes the following lower-level or sub-operations 206 and 208.

At 206, network controller 120 constructs, from at least the topology indicated in the network configuration information collected at 202, a bipartite graph including first vertices (i.e., graph nodes), second vertices (i.e., graph nodes), and edges collectively representative of the topology including the VLANs (e.g., VLANs V1-V8), the PEs (e.g., PE1-PE3), and matchings of the VLANs to the PEs, respectively.

At 208, network controller 120 uses the bipartite graph to determine matchings of the VLANs to particular PEs, such that the matchings establish cost-reducing paths in the bipartite graph for which the VLANs are load balanced across the particular PEs, so as to minimize one or more of the optimizing criteria, e.g., optimizing criteria (a), (b), and/or (c) listed above. The matchings or final edges that result from matching operation 208 represent assignments of VLANs to PEs (i.e., to the particular PEs) that are to act as DFs for the VLANs. The particular PEs are the PEs lying along the cost-reducing paths. To determine the matchings, operation 208 applies a semi-matching algorithm to the bipartite graph, which manipulates the edges in the bipartite graph in an iterative process, to find the cost-reducing paths.

At 210, network controller 120 programs the particular PEs as the DFs for the VLANs with the matchings to the particular PEs. To do this, network controller 120 notifies the particular PEs of the VLANs (e.g., using VLAN IDs) for which the particular PEs have been elected/assigned as DFs. Operation 210 may be performed using BGP notifications, for example.

Figure 3:
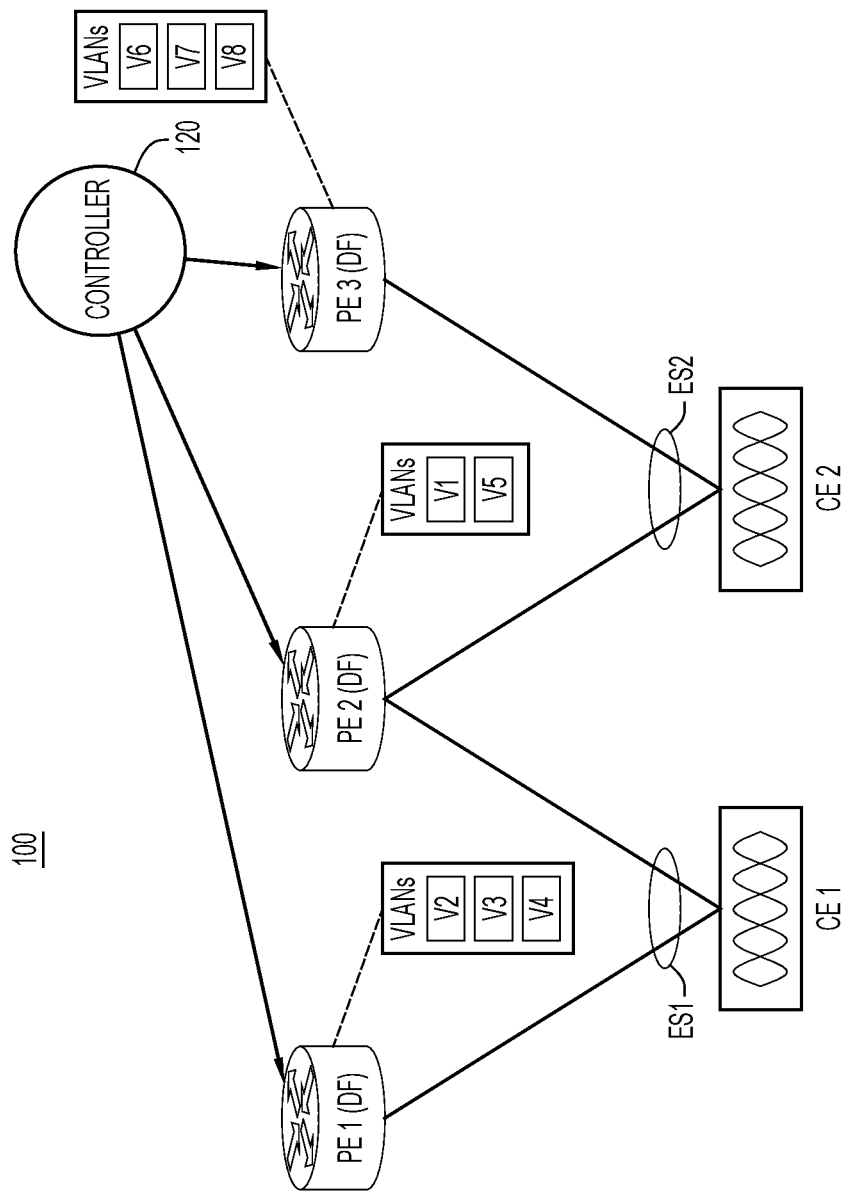
FIG. 3 is an illustration of load balanced assignments of VLANs to PEs elected as DFs as a result of the method of FIG. 2, according to an example embodiment.

With reference to FIG. 3, there is an illustration of example load balanced assignments of VLANs to particular PEs/DFs resulting from method 100 as applied to network 100 (RR 18 is omitted from FIG. 3). In the example of FIG. 3, network controller 120 has assigned 3 VLANs V2, V3, and V4 to PE1 as DF for those VLANs, 2 VLANs V1 and V5 to PE2 as the DF for those VLANs, and 3 VLANs V6, V7, and V8 to PE3 as DF for those VLANs. Although PE2 is shared across Ethernet segments ES1 and ES2, the differential in the number of VLANs assigned to PE2 compared to each of PE1 and PE3 is less than 2, which is less than the differential in the number that would have been assigned using conventional DF election. Accordingly, method 200 results in improved load balancing compared to conventional DF election.

More generally, assuming the Ethernet segments are configured with respective sets of VLANs and share a common PE (e.g., PE2), then network controller 120 elects the common PE as a DF for a given VLAN in the respective sets of VLANs as a function of all of the respective sets of VLANs to achieve load balancing across all of the Ethernet segments, as opposed to election based on a single set of VLANs on a single Ethernet segment as is done in conventional DF election.

An example in which the semi-matching algorithm described above is applied to a bipartite graph to optimize load balancing based on average service time, makespan times, and variance (i.e., criteria (a) listed above) is described below in connection with FIGS. 4-7, which show the bipartite graph. The bipartite graph shown in FIGS. 4-7 is representative of a topology of an example network that is similar to, but not the same as, network 100. FIGS. 4-7 show the bipartite graph after successive stages/operations of the semi-matching algorithm. The semi-matching algorithm described in connection with FIGS. 4-7 is referred to as "VLAN carving" of a bipartite graph that is unweighted.

With reference to FIGS. 4-7, generally, the example network represented by the bipartite graph includes Ethernet segments ES1, ES2, and ES3. Ethernet segment ES1 includes PE1 and PE2 multi-homed to CE1, Ethernet segment ES2 includes PE2 and PE3 multi-homed to CE2, and Ethernet segment ES3 includes PE2 and PE3 multi-homed to CE3. Thus, ES1, ES2, and ES3 share PE2. PEs PE1-PE3 are represented as first vertices on the right-hand side of the bipartite graph. Potentially, Ethernet segments ES1, ES2, and ES3 may be configured with respective sets of VLANs having VLAN IDs [1 . . . 400], [300 . . . 499], and [250 . . . 499]; however, the example of FIGS. 4-7 focuses on VLANs V1-V5, which are represented as second vertices on the left-hand side of the bipartite graph. VLANS V1-V3 are configured on ES1, VLAN V4 is configured on ES2, and VLAN V5 is configured on ES3.

The bipartite graph includes two types of edges that connect various ones of VLANs V1-V5 (VLAN vertices) to various ones of PE1-PE3 (PE vertices). The two types of edges include (i) unmatched edges (dashed lines) that represent potential, indefinite, matchings of VLANs to PEs, i.e., VLANs that are unmatched to the PEs, and (ii) matched edges (solid lines) that represent actual, definite, matchings of VLANs to PEs. In addition, the semi-matching algorithm defines (i) an alternating path in the bipartite graph as a path that alternates between unmatched and unmatched edges, and (ii) a cost-reducing path as an alternating path in which a difference in an in-degree of matched edges of a start vertex and an end vertex of the cost-reducing path is at least two, where the in-degree of a given vertex is the number of edges that are incident to the vertex.

Figure 4:
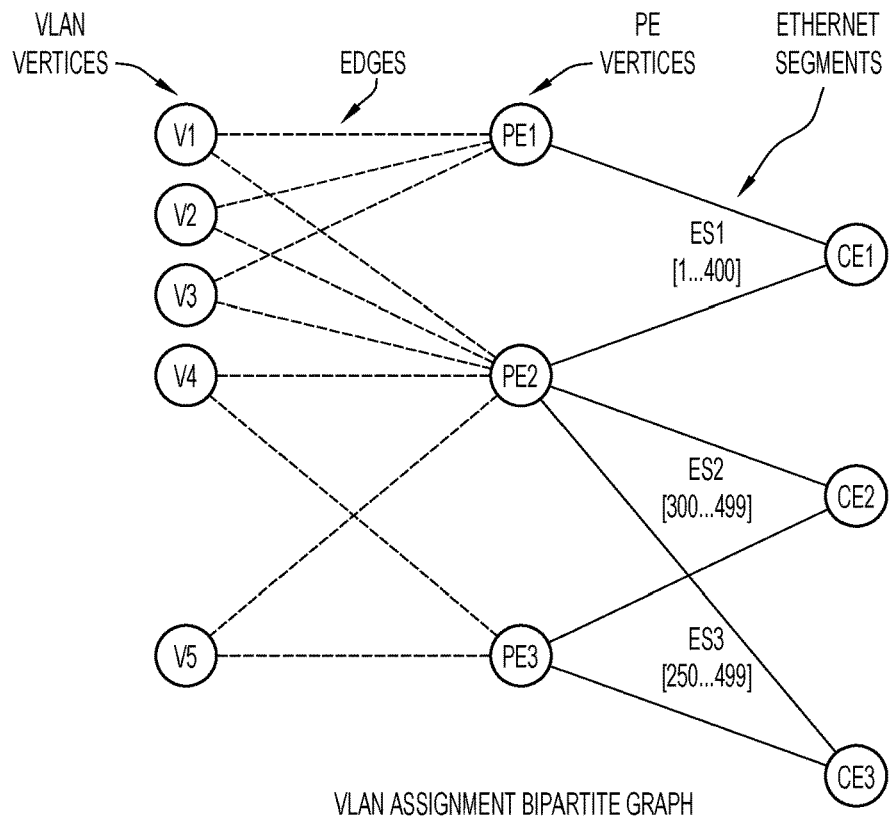
FIG. 4 shows a bipartite graph representative of a network topology including VLANs and PEs and that is configured according to a first operation of a semi-matching algorithm that matches the VLANs to particular PEs as DFs for VLAN traffic, according to an example embodiment.

To determine DFs for VLANs V1-V5 among PE1-PE3, the semi-matching algorithm performs a sequence of operations on the bipartite graph. The operations manipulate the edges of the bipartite graph to search for and find cost-reducing paths that identify the DFs, i.e., coincide with the DFs. The sequence of operations includes a first operation that configures all edges of the bipartite graph as unmatched edges (i.e., potentially matching edges). With reference to FIG. 4, there is an illustration of the bipartite graph resulting from the first operation. As shown, VLANs V1, V2, and V3 can each be matched (i.e., has potential mappings) to PE1 or PE2 on ES1, VLAN V4 can be matched to PE2 or PE3 on ES2, and VLAN V4 can be matched to PE2 or PE3 on ES3.

Figure 5:
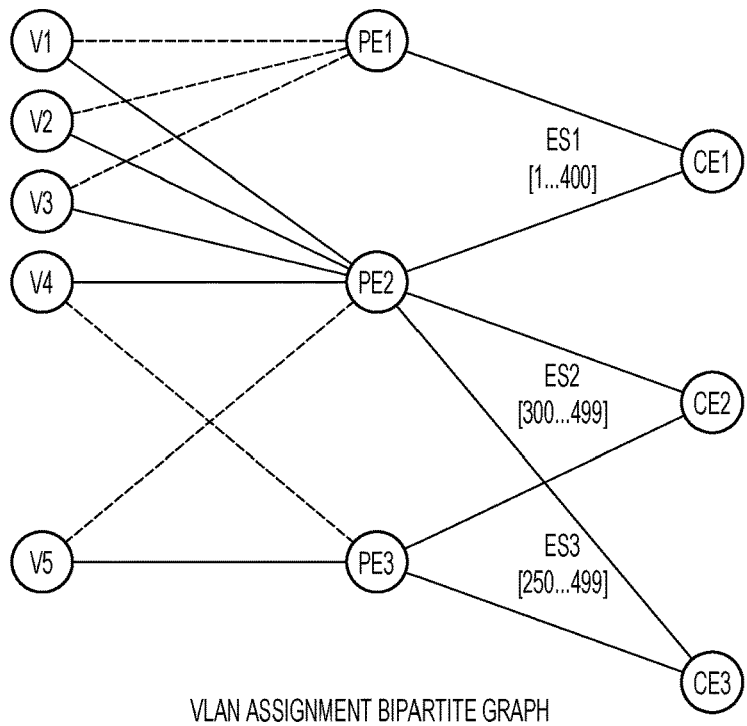
FIG. 5 shows the bipartite graph configured according to a second operation of the semi-matching algorithm, according to an example embodiment.

A second operation arbitrarily/randomly converts some of the unmatched edges on the bipartite graph to matched edges. With reference to FIG. 5, there is an illustration of the bipartite graph resulting from the second operation. As shown, VLANs V1, V2, V3, and V4 are matched (i.e., have respective mappings) to PE2, and VLAN V5 is matched to PE3. Also, the matched in-degree of PE2 is 4, the matched in-degree of PE1 is 0, and the matched in-degree of PE3 is 1. Thus, the bipartite graph includes a cost-reducing path (PE2, V3, PE1) that satisfies the following two criteria of a cost-reducing path. First, the path includes alternating matched and unmatched edges because the path starts from matched vertex PE3 and ends on unmatched vertex PE1. Second, the difference in the in-degree of the matched edges of the start vertex (PE3, in-degree 1) and the end vertex (PE1, in-degree 3) is at least 2.

Figure 6:
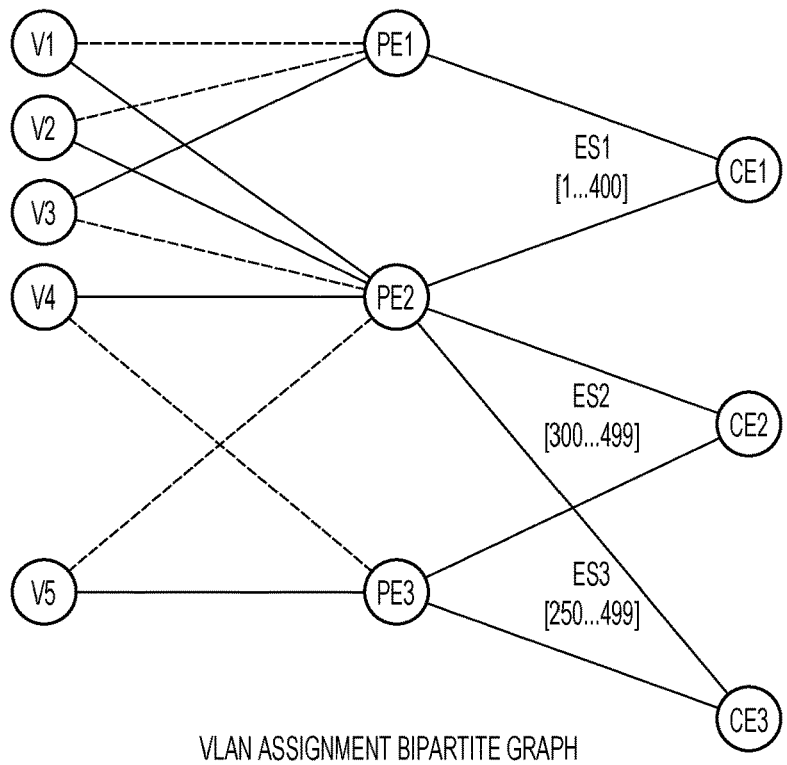
FIG. 6 shows the bipartite graph configured according to a third operation of the semi-matching algorithm, according to an example embodiment.
Figure 7:
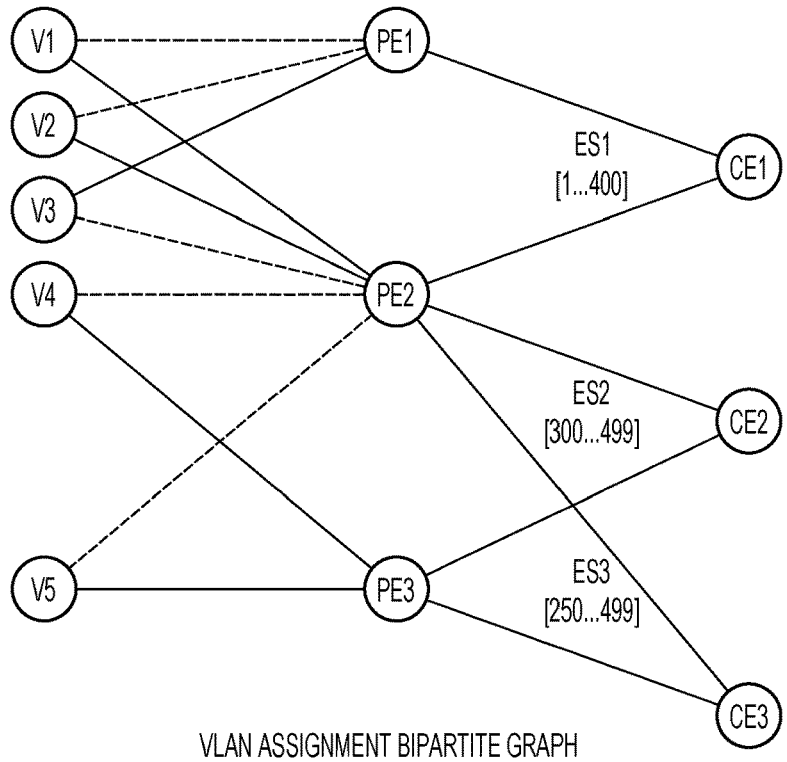
FIG. 7 shows the bipartite graph configured with least cost paths that indicate DFs according to a fourth and final operation of the semi-matching algorithm, according to an example embodiment.

At third operation flips/inverts the matched and unmatched edges of the cost-reducing path, such that vertex V3 becomes matched to PE1. With reference to FIG. 6, there is an illustration of the bipartite graph after the flip operation.

At fourth operation flips/inverts another cost-reducing path to match V4 to PE3. The semi-matching algorithm terminates after the fourth operation because there are no more cost-reducing paths, and the algorithm has found/determined globally fair assignments of VLANS to DFs. Specifically, PE1 is a DF for one VLAN (V3), PE2 is a DF for two VLANs (V1, V2), and PE3 is a DF for 2 VLANs (V4, V5).

Figure 8:
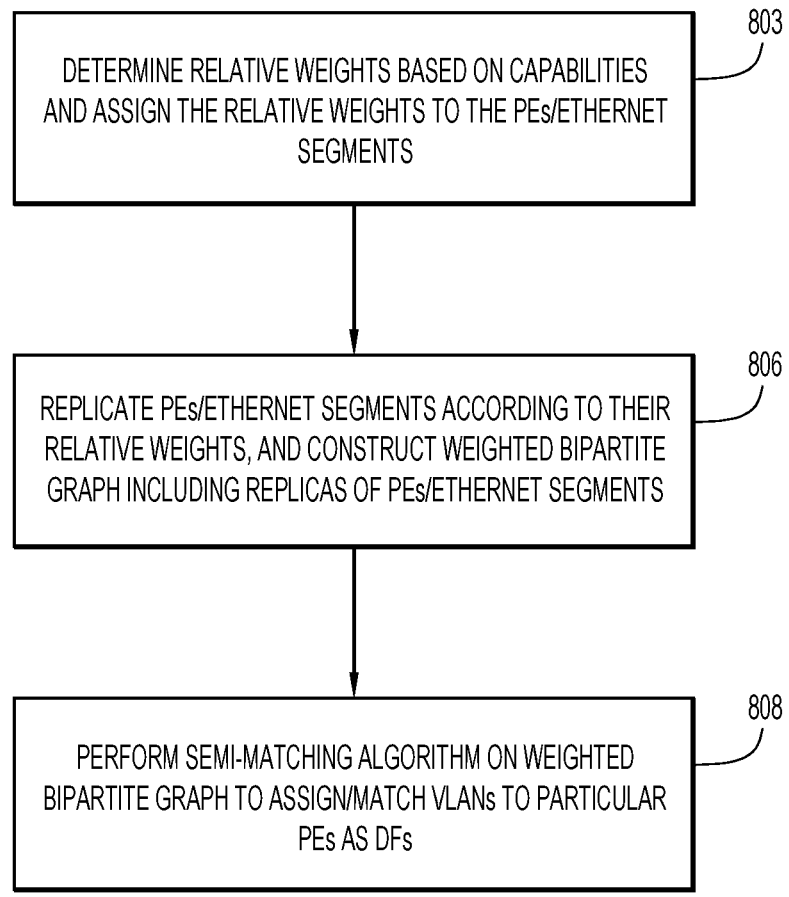
FIG. 8 shows generalized operations performed by the semi-matching algorithm on a weighted bipartite graph to perform DF election based on PE weights and/or Ethernet segment weights reflected in the weighted bipartite graph, according to an example embodiment.

A generalized example in which the semi-matching algorithm is applied to a bipartite graph to optimize load balancing with respect to PE weights and/or Ethernet segment link weights (i.e., with respect to optimizing criteria (b) and/or (c) listed above) is now described in connection with FIG. 8. With reference to FIG. 8, there are shown operations 800 performed by network controller 120 to perform DF election in network 100 based on the PE weights and/or the Ethernet segment link weights. Operations 800 modify and/or are in addition to the operations of method 200 described above. Operations 800 assume that respective capabilities of PEs (e.g., respective processor powers of PE1-PE3) and/or respective capabilities of Ethernet segments to which the PEs belong (e.g., respective link capacities of the various Ethernet links included in each of ES1 and ES2) are known.

At 803, network controller 120 computes relative weights for the PEs and/or Ethernet segments that are based on their respective processor powers and/or respective link capacities, and then then assigns the relative weights to the PEs and/or the Ethernet segments.

At 806, for purposes of constructing a bipartite graph, network controller 120 first replicates instances of the PEs and/or the Ethernet segments respective numbers of times according to their relative weights, to produce one or more replicated PEs and/or one or more replicated Ethernet segments. Then, network controller 120 constructs a bipartite graph based on the topology and VLAN information collected in operation 202, and that is also weighted based on the relative weights from 803. That is, network controller 120 constructs a weighted bipartite graph. To do this, network controller 120 constructs the weighted bipartite graph based on all of the PEs and the Ethernet segments, including the replica PEs and/or Ethernet segments. That is, the weighted bipartite graph includes the PE/Ethernet segment vertices as well as any replica PE/Ethernet segment vertices. The weighted bipartite graph is configured such that all of the edges incident to a given PE/Ethernet segment vertex that has been replicated are also incident to each of the replica(s) of that PE/Ethernet segment.

At 808, network controller 120 performs the semi-matching algorithm on the weighted bipartite graph to assign VLANs V1-V5 to particular PEs as DFs among the PEs and their respective replicas and/or Ethernet segments and/or their respective replicas. Then, network controller 120 maps to each PE the entire set of VLANs that match to the PE and its replica(s) and/or the corresponding Ethernet segment and its replica in the weighted bipartite graph. Next network controller 120 programs the particular PEs as the DFs for the VLANs to which the particular PEs are matched, as described above.

Figure 9:
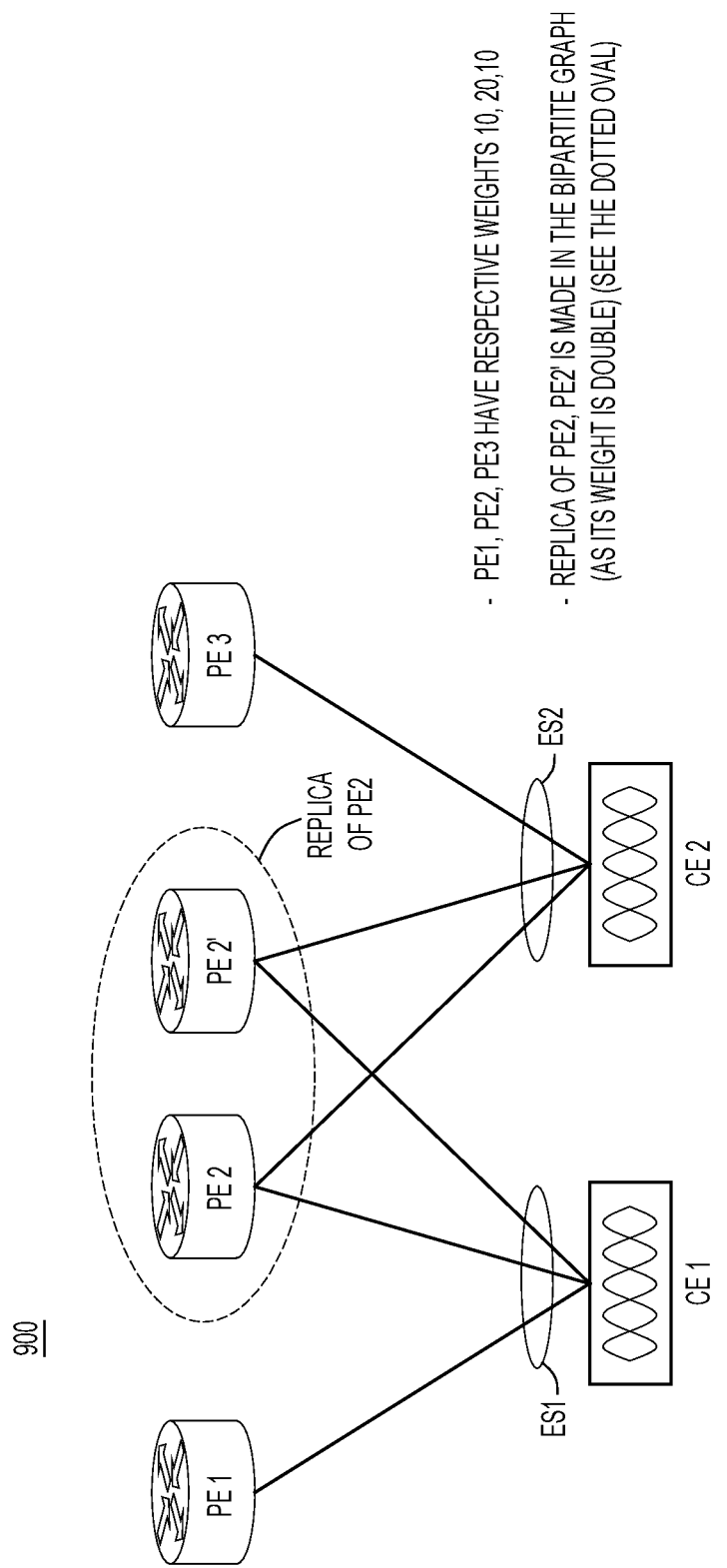
FIG. 9 is an illustration of a network topology used to construct a weighted bipartite graph including a replica PE that reflects relative PE weights, according to an example embodiment.

An example in which operations 800 construct a weighted bipartite graph to be optimized based on PE processor power/weights (i.e., optimizing criterion (b) discussed above in connection with operation 204) is now described in connection with FIGS. 9 and 10. With reference to FIG. 9 there is an illustration of example topology 900 for network 100 including a replica PE2', created based on the relative weights of PE1-PE3, for incorporation into the weighted bipartite graph. Operations to compute the relative weighs of the PEs and their replicas based on the weights may include the following. Assume respective processor powers C1, C2, and C3 for PE1, PE2, and PE3. Network controller 120 computes relative weights W1=10, W2=20, and W3=10 for PE1, PE2, and PE3 based on their respective processing powers (operation 803). Network controller 120 may compute each weight Wi according to the equation: Wi=round (Ci/Cmin), where i=1 . . . 3, "round" indicates rounding to the nearest integer of the ratio (Ci/Cmin), and Cmin is the smallest processor power. The weights 10, 20, and 10 may be normalized to 1, 2, and 1, respectively. Based on the relative weights, network controller 120 creates replica PE2' of PE2 because its weight is double that of the other PEs. FIG. 9 shows PE2 adjacent to its replica PE2' (both enclosed in a dashed oval).

Figure 10:
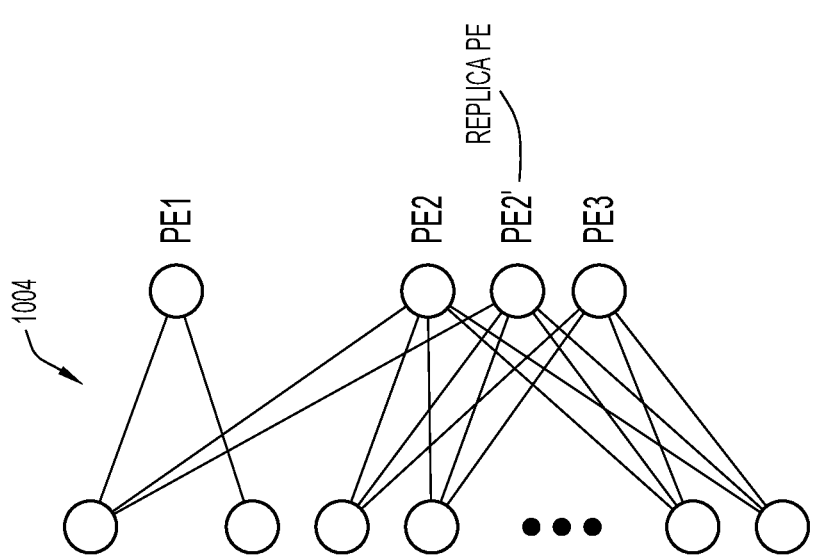
FIG. 10 shows a replication operation by which the replica PE is inserted into an initial bipartite graph, to produce the weighted bipartite graph that also includes the replica PE, according to an example embodiment.
Figure 10:
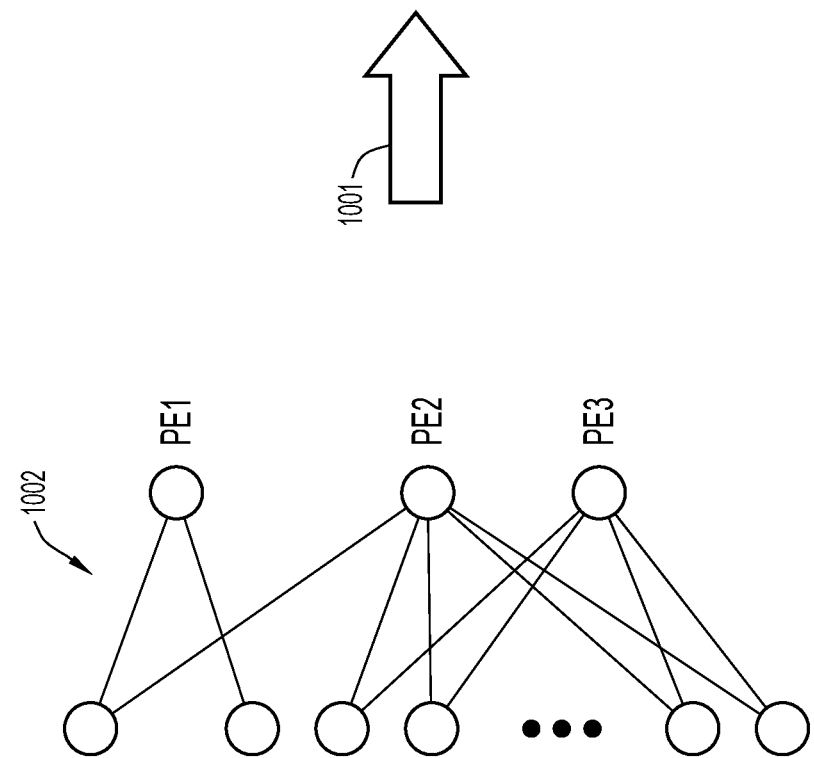

With reference to FIG. 10, there is shown a replication operation 1001 by which network controller 120 inserts replica PE2' into an initial unweighted bipartite graph 1002 representing network 100, to produce a weighted bipartite graph 1004 that also includes the replica PE2'. Network controller 120 performs the semi-matching algorithm on weighted bipartite graph 1004.

Figure 11:
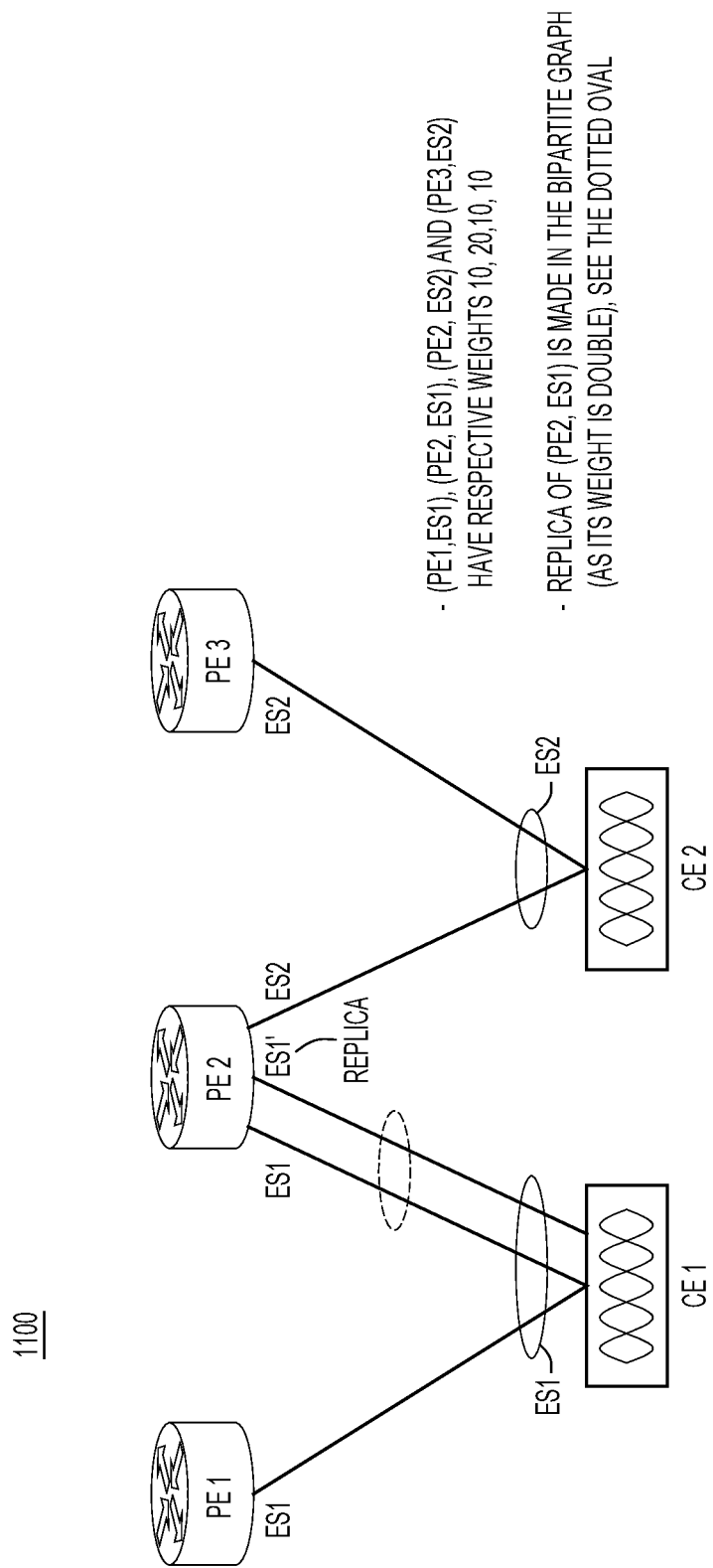
FIG. 11 is an illustration of a network topology used to construct a weighted bipartite graph including a replica Ethernet segment that reflects relative Ethernet segment weights, according to an example embodiment.

An example in which operations 800 construct a weighted bipartite graph to be optimized based on Ethernet segment interface/link capacities/weights (i.e., optimizing criterion (c) discussed above in connection with operation 204) is now described in connection with FIGS. 11 and 12. With reference to FIG. 11, there is an illustration of an example topology 1100 for network 100 including a replica Ethernet segment (interface) (PE2, ES1)' (also referred to simply as a "replica interface"), created based on the relative Ethernet segment (interface) weights, for incorporation into the weighted bipartite graph. In the example, the Ethernet segments are represented at the granularity of specific Ethernet segment interfaces associated with specific PEs, identified by the tuples (PE1, ES1), (PE2, ES1), (PE2, ES2), and (PE3, ES2). Operations leading to creation of the replica include the following. Network controller 120 receives respective Ethernet segment link capacities C1, C2, C3, and C4 for Ethernet segment interfaces (PE1, ES1), (PE2, ES1), (PE2, ES2), and (PE3, ES2). Network controller 120 computes relative Ethernet segment (interface) weights W1=10, W2=20, W3=10, and W4=10 for Ethernet segment interfaces (PE1, ES1), (PE2, ES1), (PE2, ES2), and (PE3, ES2) based on their respective link capacities. Based on the relative weights, network controller 120 creates replica (PE2, ES1)' of (PE2, ES1) because its weight is double that of the other weights.

Ethernet segment weights based on link capacities or bandwidths (BWs) many be computed in many different ways. In one example, network controller 120 may compute each Ethernet segment weight for (PE, ES) in two steps, including:

a. Compute Interface_weight as Remaining_$BW_{Interface}$/Allocated_$BW_{Interface}$.
b. Compute Ethernet segment weight as Interface_Weight/Total no. of EVIs configured on PE for the Ethernet segment.

In one example, network controller 120 may collect the bandwidth information from the PE, and compute the Ethernet segment weight. Alternatively, collector devices distributed across network 100 and associated with the PEs may collect the bandwidth information, compute statistics (including the weights) based on the collected information, and then forward the statistics to network controller 120.

Figure 12:
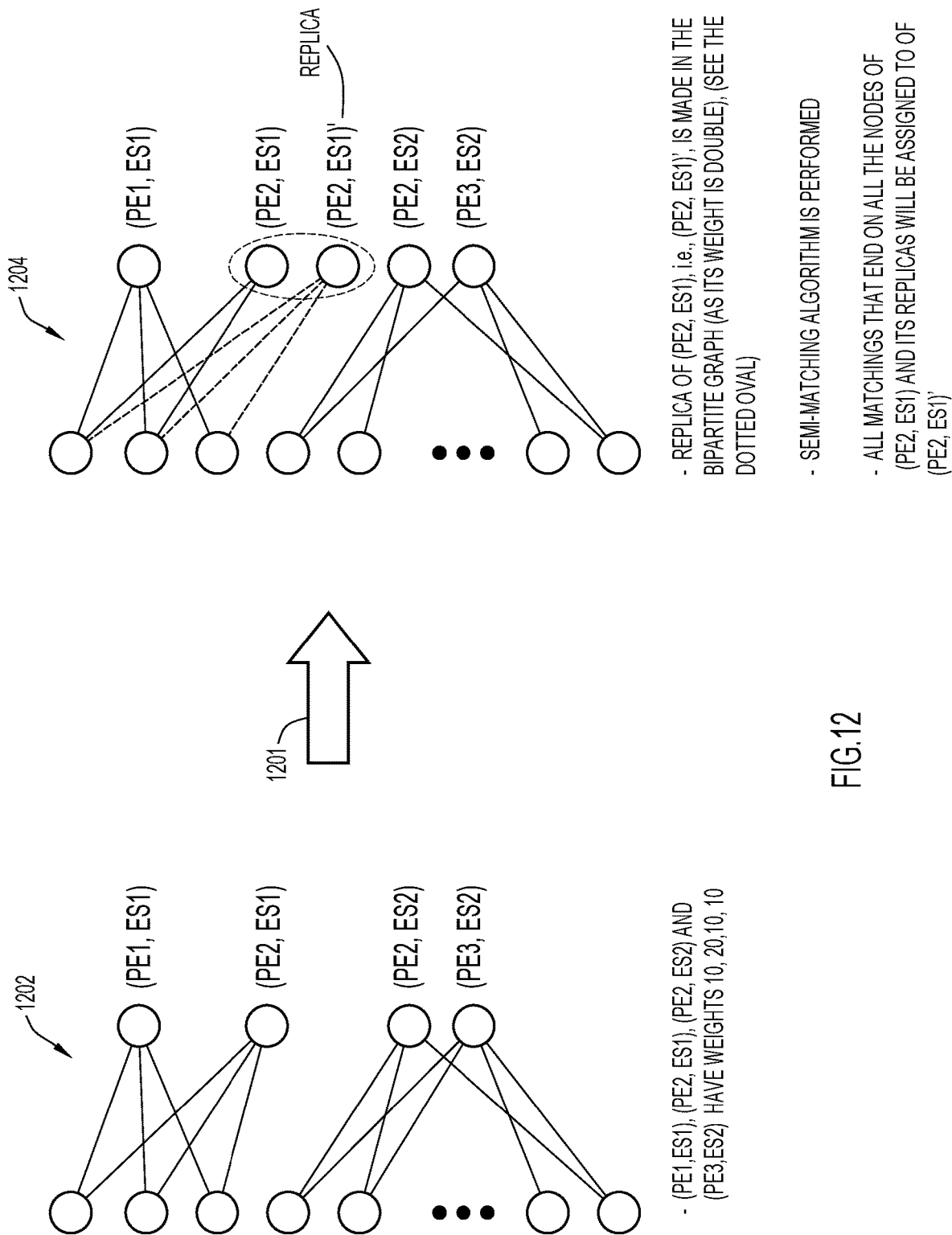
FIG. 12 shows a replication operation by which the replica Ethernet segment is inserted into an initial bipartite graph, to produce the weighted bipartite graph that also includes the replica Ethernet segment, according to an example embodiment.

With reference to FIG. 12, there is shown a replication operation 1201 by which network controller 120 inserts replica (PE2, ES1)' into (i.e., adds the replica to) an initial unweighted bipartite graph 1202 representing network 100, to produce a weighted bipartite graph 1204 that also includes replica (PE2, ES1)' (operation 806). Network controller 120 performs the semi-matching algorithm on bipartite graph 1204.

As described above, network controller 120 may use different optimizing criteria to influence DF election across a multi-homed topology. In another embodiment, network controller 120 may further employ Internet Group Management Protocol (IGMP) group limits to influence the DF election. The IGMP group limit restricts the number of IGMP members on a customer segment that are permitted to join per interface. Consider an example with an IGMP group limit of 1000 per system. Assume a PE supports a first multi-homed link to a CE, and also supports a second orphan link that is not multi-homed. Assume the PE receives 1000 IGMP joins from the orphan link, and then receives 500 joins from the multi-homed link. In that case, the PE will drop the new joins. Network controller 120 keeps track of such limitations across the Ethernet segments and their PEs, and uses the limitations and numbers of joins to influence DF election.

Figure 13:
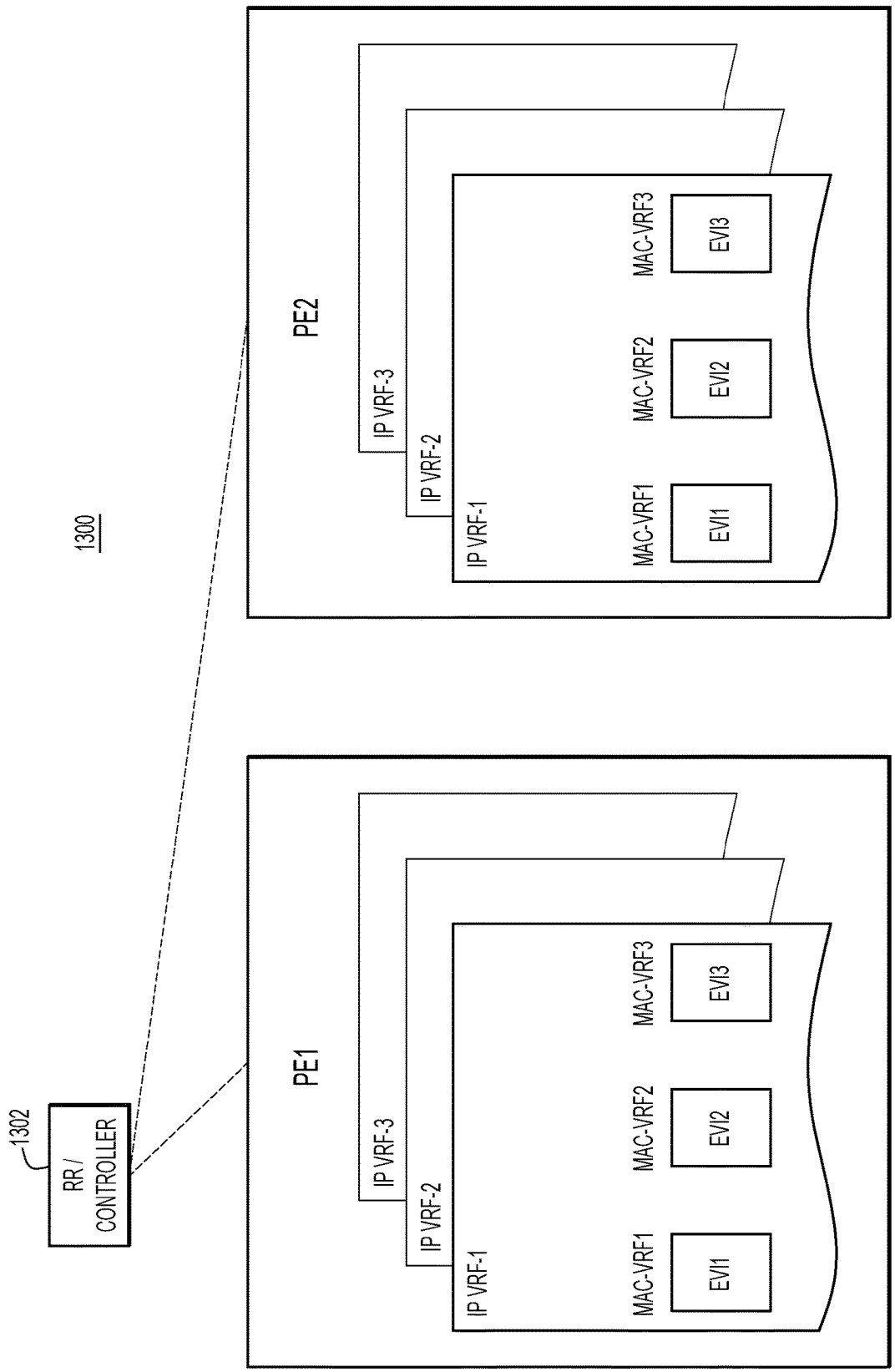
FIG. 13 is an illustration of a segment of a network including PEs configured with Internet Protocol (IP)-Virtual Routing and Forwarding (VRF) (IP-VRF) instances and media access control (MAC)-VRFs (MAC-VRFs) and on which DF election is performed, according to another embodiment.

With reference to FIG. 13, there is an illustration of a segment of a network 1300 useful for describing network controller DF election according to another embodiment. FIG. 13 shows a network controller 1302 configured to control multi-homed PEs PE1 and PE2 (which may be the same as or different from the PEs of FIG. 1). Network controller 1302 combines network control and route reflector components. To forward BUM traffic, PE1 is configured with 3 IP-VRFs including IP-VRF-1, IP-VRF-2, and IP-VRF-3. PE1 is also configured with 3 MAC-VRFs MAC-VRF1, MAC-VRF2, and MAC-VRF3, also referred to as EVI1, EVI2, and EVI3, respectively. PE2 is configured similarly to PE1. PE1 and PE2 are each configured with a maximum number of flows that its IP-VRFs can collectively support, and a maximum number of flows that each of the EVIs can support.

During operation, network controller 1302 elects DFs for various flows associated with the EVIs and IP-VRFs on PE1 and PE2. To do this, network controller 1302 tracks DF load statistics, including a current EVI load (i.e., no. of EVI flows) and a current IP-VRF load (i.e., no. of IP-VRF flows), as well as a remaining no. of EVI flows and a remaining no. of IP-VRF flows that can be handled without exceeding the maximum flows, on each of PE1 and PE2. When the PEs receive new joins to receive BUM flows associated with the IP VRFs or the EVIs, network controller 1302 elects DFs on PE1 or PE2 to forward the flows based on the DF load statistics. Thus, for example, if EVI1 on PE1 receives a join and the maximums flows for EVI1 and/or the IP-VRFs have been reached on PE1, but not on PE2, network controller 1302 recognizes that PE2 is not fully loaded and assigns a DF for the new flow on EVI1 on PE2. Thus, network controller performs DF load balancing across the PEs based on cross-PE load information.

Figure 14:
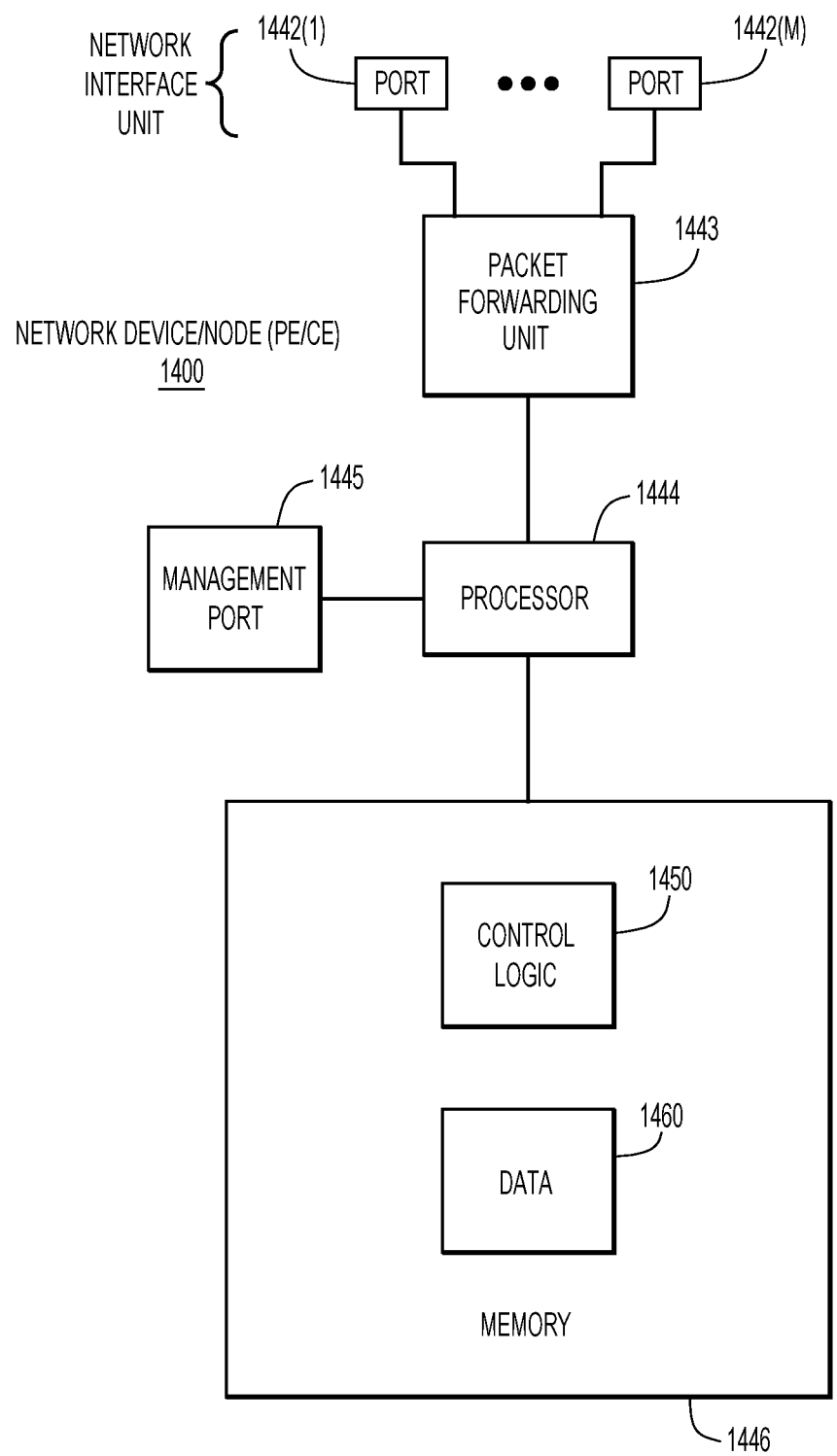
FIG. 14 is a block diagram of a network device representative of a PE, according to an example embodiment.

With reference to FIG. 14, there is a block diagram of an example network device 1400, representative of each of PE1-PE3. Network device 1400 may be a router or a switch. Network device 1400 comprises a network interface unit having a plurality of network input/output (I/O) ports 1442(1)-1442(M) to send traffic (e.g., IP packets) to a network and receive traffic (e.g., IP packets) from the network, a packet forwarding/processing unit 1443, a network processor 1444 (also referred to simply as "processor"), a management port 1445 to exchange control messages with other network devices and an administration function, and a memory 1446. The packet forwarding/processing unit 1443 is, for example, one or more ASICs that include packet buffers, packet queues, and other control logic for performing packet forwarding operations. The processor 1444 is a microcontroller or microprocessor that is configured to perform higher-level controls of network device 1400. To this end, the memory 1446 stores software instructions that, when executed by the processor 1444, cause the processor 1444 to perform a variety of operations including operations described herein. Control logic 1450 may also include logic components in packet forwarding unit 1443. Memory 1446 also stores data 1460 used and generated by logic 1450. Such data may include traffic forwarding information, path status, packets, and so on, as described above.

FIG. 15 illustrates a hardware block diagram of a computing device 1500 that may perform the functions of network controllers described herein, e.g., network controllers 120 and 1302. It should be appreciated that FIG. 15 provides only an illustration of one embodiment and does not imply any limitations with regard to the environments in which different embodiments may be implemented. Many modifications to the depicted environment may be made.

As depicted, the device 1500 includes a bus 1512, which provides communications between computer processor(s) 1514, memory 1516, persistent storage 1518, communications unit 1520, and input/output (I/O) interface(s) 1522. Bus 1512 can be implemented with any architecture designed for passing data and/or control information between processors (such as microprocessors, communications and network processors, etc.), system memory, peripheral devices, and any other hardware components within a system. For example, bus 1512 can be implemented with one or more buses.

Memory 1516 and persistent storage 1518 are computer readable storage media. In the depicted embodiment, memory 1516 includes random access memory (RAM) 1524 and cache memory 1526. In general, memory 1516 can include any suitable volatile or non-volatile computer readable storage media. Instructions for the Control Logic may be stored in memory 1516 or persistent storage 1518 for execution by processor(s) 1514.

One or more programs may be stored in persistent storage 1518 for execution by one or more of the respective computer processors 1514 via one or more memories of memory 1516. The persistent storage 1518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1518 may also be removable. For example, a removable hard drive may be used for persistent storage 1518. Other examples include optical and magnetic disks, thumb drives, and smart cards that are inserted into a drive for transfer onto another computer readable storage medium that is also part of persistent storage 1518.

Communications unit 1520, in these examples, provides for communications with other data processing systems or devices. In these examples, communications unit 1520 includes one or more network interface cards. Communications unit 1520 may provide communications through the use of either or both physical and wireless communications links.

I/O interface(s) 1522 allows for input and output of data with other devices that may be connected to computer device 1500. For example, I/O interface 1522 may provide a connection to external devices 1528 such as a keyboard, keypad, a touch screen, and/or some other suitable input device. External devices 1528 can also include portable computer readable storage media such as database systems, thumb drives, portable optical or magnetic disks, and memory cards.

Software and data used to practice embodiments can be stored on such portable computer readable storage media and can be loaded onto persistent storage 1518 via I/O interface(s) 1522. I/O interface(s) 1522 may also connect to a display 1530. Display 1530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided comprising: at a network controller: receiving information that defines a topology of a network having Ethernet Segments configured with virtual local area networks (VLANs) and including provider edges that are multi-homed to customer edges; based on the topology, determining for the VLANs particular provider edges among the provider edges that are to operate as designated forwarders of traffic for the VLANs, such that the VLANs are load balanced across the particular provider edges; and programming the particular provider edges as the designated forwarders of traffic for the VLANs.

In another form, an apparatus is provided apparatus comprising: a network interface unit to communicate with a network; and a processor coupled to the network interface unit and configured to operate as a network controller, the processor configured to perform: receiving information that defines a topology of a network having Ethernet Segments configured with virtual local area networks (VLANs) and including provider edges that are multi-homed to customer edges; based on the topology, determining for the VLANs particular provider edges among the provider edges that are to operate as designated forwarders of traffic for the VLANs, such that the VLANs are load balanced across the particular provider edges; and programming the particular provider edges as the designated forwarders of traffic for the VLANs.

In yet another form, a non-transitory computer readable medium is provided. The computer readable medium is encoded with instructions that, when executed by a processor of a network controller, cause the processor to perform: receiving information that defines a topology of a network having Ethernet Segments configured with virtual local area networks (VLANs) and including provider edges that are multi-homed to customer edges; based on the topology, determining for the VLANs particular provider edges among the provider edges that are to operate as designated forwarders of traffic for the VLANs, such that the VLANs are load balanced across the particular provider edges; and programming the particular provider edges as the designated forwarders of traffic for the VLANs.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a network controller, receiving information that defines a topology of a network having Ethernet Segments configured with virtual local area networks (VLANs) and including provider edges that are multi-homed to customer edges;
   constructing, from the topology, a bipartite graph that include first vertices to represent the VLANs, second vertices to represent the provider edges, and edges to represent matchings of the VLANs to the provider edges;
   using a semi-matching algorithm, determining matchings of the VLANs to particular provider edges of the provider edges along cost-reducing paths of the bipartite graph having vertices among the second vertices that meet predetermined criteria with respect to an in-degree of edges at the vertices, wherein the particular provider edges are to operate as designated forwarders across which traffic for the VLANs is load balanced; and
   programming the particular provider edges as the designated forwarders for the VLANs.

2. The method of claim 1, wherein:
   programming includes programming the particular provider edges as the designated forwarders of the traffic for the VLANs with the matchings to the particular provider edges.

3. The method of claim 1, wherein the information includes capabilities of the provider edges, and the method further comprises:
   assigning relative weights to the provider edges based on the capabilities; and
   replicating one or more of the provider edges in the bipartite graph according to the relative weights, to produce one or more replica provider edges in the bipartite graph,
   wherein determining the matchings includes determining the matchings based on the provider edges and the one or more replica provider edges in the bipartite graph.

4. The method of claim 3, wherein:
   the capabilities include processing powers of the provider edges; and
   assigning relative weights includes assigning relative weights to the provider edges based on the processing powers.

5. The method of claim 1, wherein the information includes link capacities of interfaces of the Ethernet Segments, and the method further comprises;
   assigning relative weights to the interfaces based on the link capacities; and
   replicating one or more of the interfaces in the bipartite graph according to the relative weights, to produce one or more replica interfaces in the bipartite graph,
   wherein determining the matchings includes determining the matchings based on the interfaces and the one or more replica interfaces in the bipartite graph.

6. The method of claim 5, wherein the interfaces are represented as respective (provider edge, Ethernet segment identifier) tuples.

7. The method of claim 1, wherein the provider edges are configured to forward broadcast, unknown unicast, and multicast traffic originating from source equipment.

8. The method of claim 1, wherein:
   the bipartite graph includes unmatched edges and matched edges to represent the VLANs as being unmatched and matched to the provider edges, respectively; and
   the semi-matching algorithm defines (i) an alternating path in the bipartite graph as a path that alternates between unmatched and unmatched edges, and (ii) a cost-reducing path as an alternating path in which a difference in an in-degree of matched edges of a start vertex and an end vertex of the cost-reducing path is at least two.

9. The method of claim 1, wherein programming the particular provider edges as the designated forwarders includes notifying the particular provider edges of their designated forwarder status via Border Gate Protocol (BGP) notifications.

10. The method of claim 1, wherein the Ethernet Segments share at least some of the provider edges.

11. The method of claim 1, wherein the Ethernet Segments are configured with respective sets of VLANs and share a common provider edge among the provider edges, and determining includes electing the common provider edge as a designated forwarder for a given VLAN in the respective sets of VLANs as a function of all of the respective sets of VLANs.

12. An apparatus comprising:
    a network interface unit to communicate with a network; and
    a processor coupled to the network interface unit and configured to operate as a network controller, the processor configured to perform:

receiving information that defines a topology of a network having Ethernet Segments configured with virtual local area networks (VLANs) and including provider edges that are multi-homed to customer edges;

constructing, from the topology, a bipartite graph that include first vertices to represent the VLANs, second vertices to represent the provider edges, and edges to represent matchings of the VLANs to the provider edges;

using a semi-matching algorithm, determining matchings of the VLANs to particular provider edges of the provider edges along cost-reducing paths of the bipartite graph having vertices among the second vertices that meet predetermined criteria with respect to an in-degree of edges at the vertices, wherein the particular provider edges are to operate as designated forwarders across which traffic for the VLANs is load balanced; and programming the particular provider edges as the designated forwarders for the VLANs.

13. The apparatus of claim 12, wherein:

the processor is configured to perform programming by programming the particular provider edges as the designated forwarders of the traffic for the VLANs with the matchings to the particular provider edges.

14. The apparatus of claim 12, wherein the information includes capabilities of the provider edges, and the processor is further configured to perform:

assigning relative weights to the provider edges based on the capabilities; and replicating one or more of the provider edges in the bipartite graph according to the relative weights, to produce one or more replica provider edges in the bipartite graph, wherein the processor is configured to perform determining the matchings by determining the matchings based on the provider edges and the one or more replica provider edges in the bipartite graph.

15. The apparatus of claim 12, wherein the provider edges are configured to forward broadcast, unknown unicast, and multicast traffic originating from source equipment.

16. The apparatus of claim 12, wherein:

the bipartite graph includes unmatched edges and matched edges to represent the VLANs as being unmatched and matched to the provider edges, respectively; and the semi-matching algorithm defines (i) an alternating path in the bipartite graph as a path that alternates between unmatched and unmatched edges, and (ii) a cost-reducing path as an alternating path in which a difference in an in-degree of matched edges of a start vertex and an end vertex of the cost-reducing path is at least two.

17. The apparatus of claim 12, wherein the Ethernet Segments share at least some of the provider edges.

18. A non-transitory computer readable medium encoded with instructions that, when executed by a processor, cause the processor of a network controller to perform:

receiving information that defines a topology of a network having Ethernet Segments configured with virtual local area networks (VLANs) and including provider edges that are multi-homed to customer edges;

constructing, from the topology, a bipartite graph that include first vertices to represent the VLANs, second vertices to represent the provider edges, and edges to represent matchings of the VLANs to the provider edges;

using a semi-matching algorithm, determining matchings of the VLANs to particular provider edges of the provider edges along cost-reducing paths of the bipartite graph having vertices among the second vertices that meet predetermined criteria with respect to an in-degree of edges at the vertices, wherein the particular provider edges are to operate as designated forwarders across which traffic for the VLANs is load balanced; and programming the particular provider edges as the designated forwarders of traffic for the VLANs.

19. The non-transitory computer readable medium of claim 18, wherein:

the instructions to cause the processor to perform programming include instructions to cause the processor to perform programming the particular provider edges as the designated forwarders of the traffic for the VLANs with the matchings to the particular provider edges.

20. The non-transitory computer readable medium of claim 18, wherein the provider edges are configured to forward broadcast, unknown unicast, and multicast traffic originating from source equipment.

* * * * *